Sept. 7, 1965   B. E. NOLTINGK   3,205,485
SCREENING VANE ELECTRO-MECHANICAL TRANSDUCER
Filed Oct. 21, 1960   3 Sheets-Sheet 1
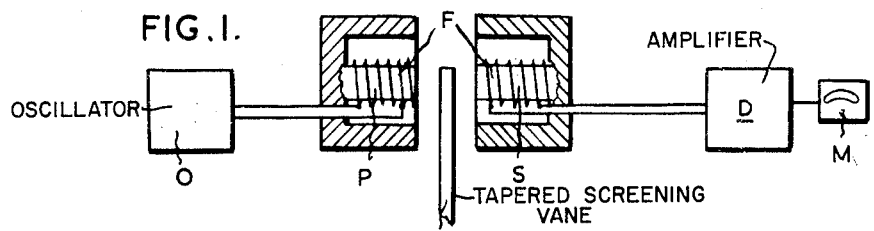
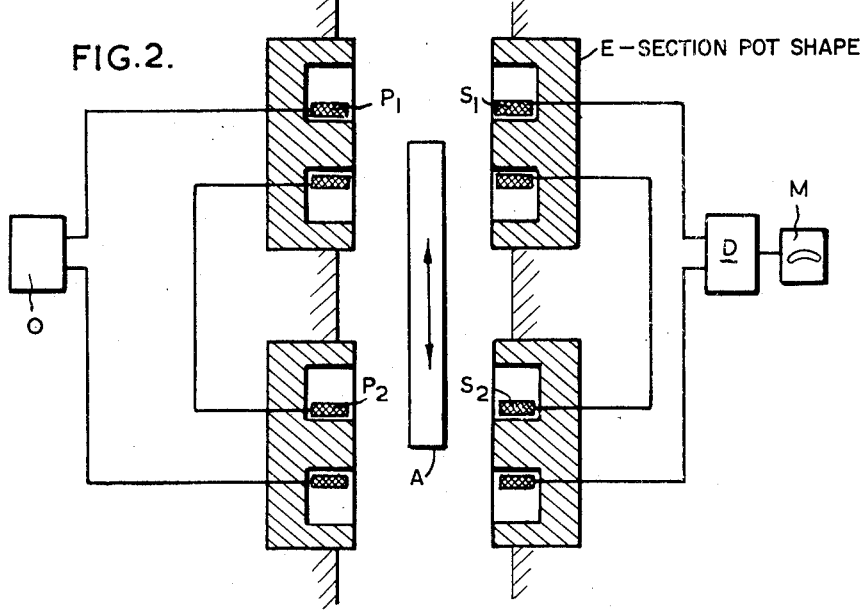
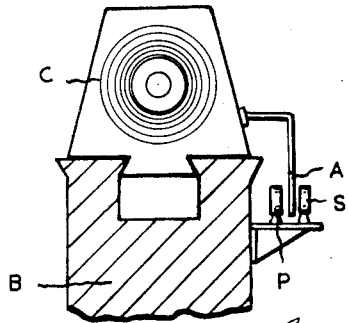

United States Patent Office 3,205,485
Patented Sept. 7, 1965

3,205,485
SCREENING VANE ELECTRO-MECHANICAL TRANSDUCER
Bernard Edward Noltingk, Cambridge, England, assignor to T.I. (Group Services) Limited, Aston, Birmingham, England, a British company
Filed Oct. 21, 1960, Ser. No. 64,166
4 Claims. (Cl. 340—196)

This invention is concerned with the measurement of small mechanical displacements by producing an electrical signal dependent upon the displacement. Such measurements are required in many different fields of engineering and instrumentation. The coversion of the displacement into an electrical signal is generally preferred to a simple mechanical device for magnifying movement, such as dial gauge, since the speed of response is much higher and the electrical signal is a convenient form for recording at a remote point, for use to actuate other devices, and for amplification to any desired degree.

Known transducers for converting small mechanical displacements into electrical signals depend on a change in electrical capacity, the reluctance of a magnetic circuit or (as in a strain gauge) resistance. A photo-electric cell may be used to produce an electrcal signal indirectly. Most of these known devices have their disadvantages and limitations. For example those relying on changes in capacitance, though sensitive over a small range, are almost invariably non-linear and can only cover a limited range of movement. In addition the capacity to earth of the live electrode may be upset by any movements in the vicinity, such as those of the operator.

Variable reluctance methods suffer from similar disadvantages, whether they produce changes in self-inductance of a single coil or in the mutual inductance between two or more coils, as in a differential transformer arrangement. Moreover, if, to obtain good sensitivity, a large current is used, an appreciable force is exerted on the element whose movement is to be detected.

Photo-electric systems, relying on interruption of a beam of light falling on a photo-electric cell, are adversely affected by ambient lighting conditions, dust, and ageing of components. The electrical output from a photo-electric cell has, furthermore, an inconveniently high impedance.

The aim of the invention is to produce an electrical signal dependent upon displacement and in a manner which overcomes the drawbacks of the existing methods set out above.

According to the invention, means for measuring relative linear mechanical displacements between two members comprise a screen in the form of a sheet or plate of electrically conducting or ferromagnetic material secured to one of the members and lying in a plane containing the direction of displacement, and a coil assembly secured to the other member, the coil assembly comprising an output coil system to which an alternating current is fed and which thereby produces an alternating field, and a pick-up coil system, the pick-up coil system being connected to means for indicating the magnitude of the signal induced in it by the field, the output and pick-up coil system being disposed on opposite sides of the plane of the screen and the arrangement being such that an edge of the screen obtrudes to a greater or lesser extent into the field between the output and pick-up coil systems as the displacement occurs and thereby alters the magnitude of the signal induced in the pick-up coil system. Normally the coil assembly will be stationary and the screen moves with a member whose displacement is to be measured, but obviously these functions could be interchanged.

This is distinct from the movement of a ferromagnetic member in the field of an inductance where the latter operates primarily to reduce the reluctance of one or more magnetic circuits and its presence increases the flux linking two or more inductances. When a screen is interposed between two inductances, on the other hand, their coupling is reduced, because of the magnetic shunting effect, and also as a consequence of the field set up by the currents induced in the screen opposing the field generated by that inductance through which a current is passed. The difference between the two methods is shown by the fact that with the present invention a non-ferromagnetic member can be used as a screen. It has, in fact, been found that in this case the sensitivity can be considerably higher than with a ferromagnetic screen.

The screen may be of material that is either ferromagnetic or electrically conducting or both. If it is ferromagnetic it forms a low reluctance path for the lines of force, and if it is electrically conducting, eddy currents are set up in it in a direction such as to produce a field opposing the exciting field. In either case the material, as a result of the field or currents induced in it, acts as a screen, and in the claims of this application I use the term "electrically inductive material" to define such materials.

The invention will now be further described by way of example with reference to the accompanying drawings, in which:

FIGURE 1 shows diagrammatically the principles of the simplest form of the invention;

FIGURE 2 shows a more accurate and sensitive practical form;

FIGURES 6 and 7 are respectively an end elevation and a side elevation of a machine tool, showing how the invention may be applied.

Figure 3:
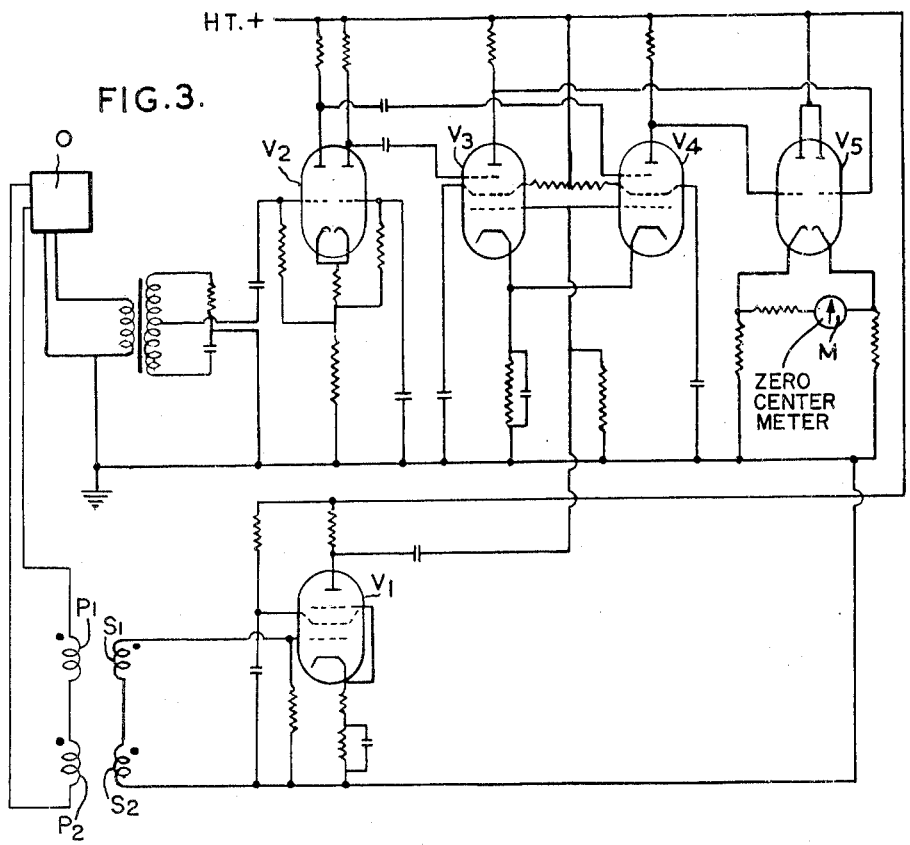
FIGURE 3 shows the circuit of the phase-sensitive detector used in the embodiment of FIGURE 2.

Referring first to FIGURE 1, an inductance P, wound on a ferrite core F, forms a primary coil and is excited from an oscillator O with a signal having a frequency of 40 kilocycles per second. Coaxial with it is a secondary coil S of identical dimensions, the output of which feeds an amplifier D. In the gap between the two coils is arranged a screen A of aluminium alloy sheet. The two coils are mounted rigidly together on one of the members between which the relative displacement is to be detected, and the screen A is mounted on the other member, the direction of displacement being in the plane of the screen, perpendicular to the common axis of the two coils.

In the simplest form of the invention, the amplifier D simply produces a signal which is proportional to the signal induced in the coil S and displays it on a meter M. The signal varies as the screen A moves to screen off the coil S from the coil P to a greater or less extent.

The method according to the invention, in contrast to known capacitative and inductive methods, is insensitive to any first order movements of the screen other than those in the direction to be measured making it less liable to error through incorrect setting up. The shape of the edge of the screen A may be varied to allow changes in sensitivity and linearity. It has been found that a screen having a part-circular end of radius equal to that of the coils has a higher sensitivity than one with a straight edge.

When the screen A is inserted fully into the gap between the coils P and S a small signal is still transmitted but with a shift in phase. By suitable choice of the thickness of the screen A and the frequency of the exciting signal this phase shift can be made 180°. When the screen is only part way across the gap the resultant signal is then represented by the vector sum of the direct signal and this phase shifted signal and at some point will be zero. This leads to an important development of the principle of the invention, as the voltage output of the secondary coil S can then be amplified by a very large factor without the necessity for backing off any standing voltage. Consequently the equipment can be made very sensitive over a range near this zero point. This is achieved by making the amplifier D a phase-sensitive detector D.

The use of a phase-sensitive detector D for the output, besides allowing much greater amplification by virtue of improved noise rejection can make the system relatively insensitive to frequency variations in the exciting current.

The mechanical layout can be varied to suit circumstances. For example it may be desirable to concentrate the magnetic flux density in a particular region to increase the sensitivity at this point and the axes of the coils may be set at an angle to one another if necessary. A differential system may employ three or more coils to detect not simple displacements but differences in displacement between two moving members.

A preferred practical embodiment is shown in FIGURE 2. This employs two primary coils $P_1$ and $P_2$ connected in series, and two secondary coils $S_1$ and $S_2$ in series opposition. The coils $P_1$ and $S_1$ have a common axis, and $P_2$ and $S_2$ also have a common axis. Each of the coils $P_1$ and $P_2$, $S_1$ and $S_2$ has a pot-shaped core, of which the central portion is of ferrite, 6 mm. in diameter, and the surrounding annular portion is of iron-dust and has an outside diameter of 16 mm. The pot-shaped cores have their open ends pointing towards the plane of the screen A. All four coils have 200 turns, giving them an inductance of about 1 millihenry.

The screen A is of a length, in the direction of displacement (this direction being indicated by the double-headed arrow) approximately equal to the distance between the two axes and is 1 mm. thick.

This means that, when the circuit is in balance and the screen A is symmetrically disposed in relation to the two pairs of coils, the signals induced in the two coils $S_1$ and $S_2$ are equal, and they cancel out, but if the screen A moves in either direction along the line of the arrow, it increases the signal in one of the coils, while simultaneously decreasing that in the other. The phase of the resultant output, in relation to the signal in the primary coils $P_1$ and $P_2$ is determined by the direction of movement of the screen A. In one particular example of the embodiment of FIGURE 2 the separation between the two axes of the coil pairs, $P_1$, $S_1$ and $P_2$, $S_2$, was 19 mm. and the length of the screen A was 16 mm. The separation between the faces of the cores of the opposing coils was 4 mm. With an input to the primary coils of 8 volts at 24 kilocycles per second, the signal across the secondary coils was 0.68 volt per millimetre of movement of the screen A.

The circuit of the detector used in the embodiment of FIGURE 2 is shown in FIGURE 3. A reference signal from the oscillator O is taken to a double triode phase-splitter $V_2$, which gives two output signals in antiphase which are fed to the suppressor grids of two pentodes $V_3$ and $V_4$. The control grids of these valves both receive the signal from the coils $S_1$ and $S_2$, amplified by a valve $V_1$. Depending on its phase with reference to the oscillator signal, the output signal produces an increase in the current in one of the valves $V_3$ and $V_4$, and a decrease in the other. The anodes of these two valves are connected to the control grids of a double-triode $V_5$ connected as a cathode-follower, and a meter M measures the difference in their D.C. cathode currents. This is a centre-zero ammeter reading up to 100 microamps each side of zero, and it may be calibrated directly in units of linear movement of the screen A.

In the arrangement described, at maximum sensitivity, full scale deflection will be produced by less than half a micron of movement. By the provision of suitable attenuators the range can be extended so that full scale deflection requires 5 millimetres of movement, i.e. 10 mm. total movement from one end of the range to the other. Thus it will be seen that, with a given set of equipment, and without any modifications required to the mechanical layout, the instrument can have a sensitivity which is variable by a factor of 10,000 to one.

Figure 4:
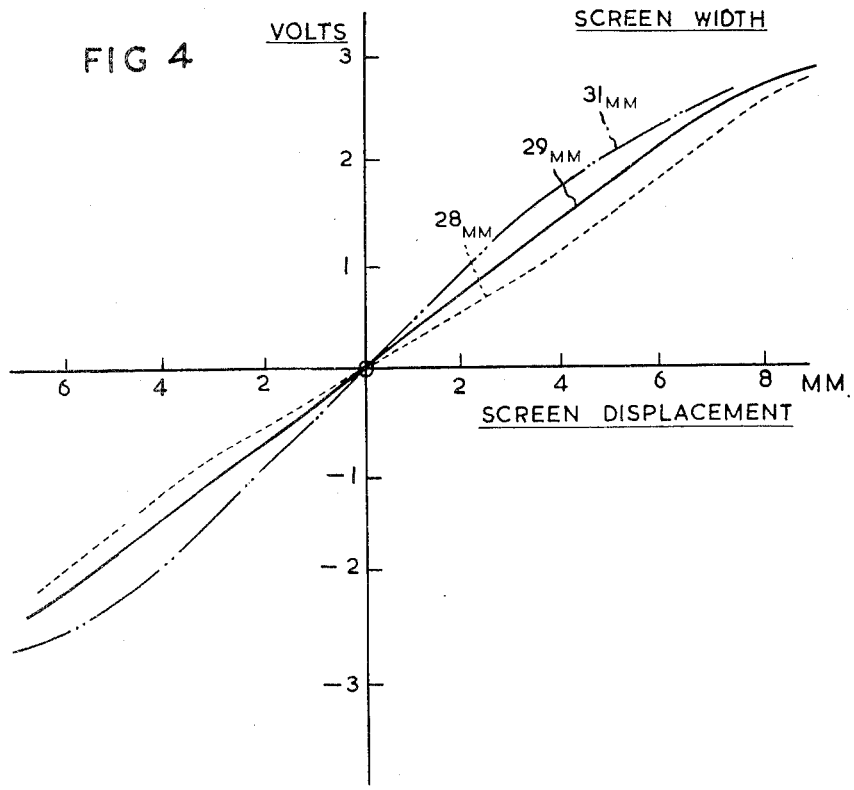
FIGURE 4 is a graph showing the performance of the embodiment of FIGURE 2.

The graph of FIGURE 4 shows the linearity of the instrument. It is a plot of voltage output of the coils $S_1$ and $S_2$ against movement of the screen A in an arrangement similar to that of FIGURE 2 but with the two axes 31 mm. apart. The three lines show the effect of varying the screen length between 28 mm. and 31 mm.

Figure 7:
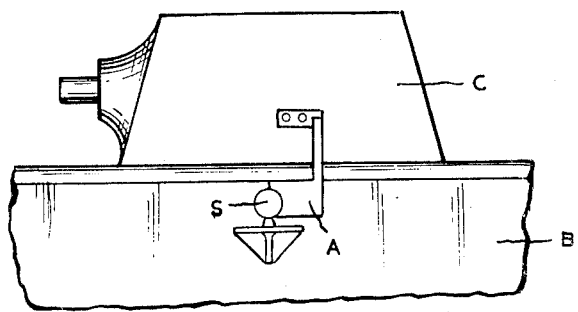

FIGURES 6 and 7 show diagrammatically how the invention may be applied, for example, to a machine tool. We must imagine a situation where a slide C, for example carrying a drilling head or a lathe tool (not shown) is capable of linear movement along a bed B, and its position has to be set with accuracy. A screen A is mounted on one of the members, namely the slide C, and the coils P and S on the other member, namely the bed B. Although only a single pair of coils is shown, there would normally be two coils on each side, as in FIGURE 2.

An advantage of the screening transducer described over known electrical displacement measuring devices, such as capacitance and inductance devices, is that the screen can pass right through between the coils without hindrance, so there is no limit to the movement that can be allowed to the moving member in the direction of measurement. This makes it possible to position a moving member successively in each of a number of predetermined positions with extreme accuracy, by the use of a corresponding number of screens A.

Figure 5:
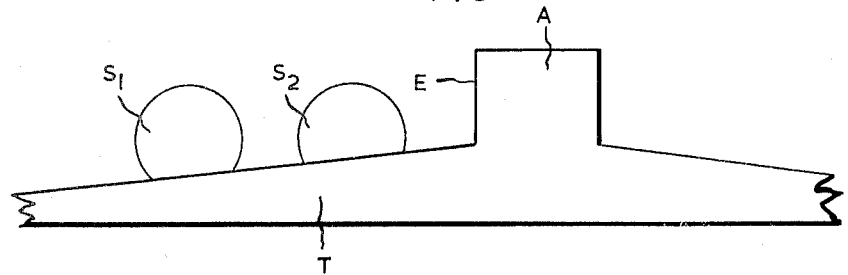
FIGURE 5 shows a modified shape of screen for a special purpose.

It will be evident that the output of the detector D, instead of being displayed on the scale of the meter M, may be employed as an error signal to control power means for moving the member to which the screen A is attached, and in this way the member can be brought to a halt at the predetermined position. To ensure the production of an error signal of the correct sign before the screen A has even reached the region of the coils, the screen may be extended in the manner shown in FIGURE 5. Here a tapered portion T extends ahead of the screen and its shape is such that the coil $S_2$ which is nearest the screen is more screened than the coil $S_1$, so that a signal is produced of a sign such as to energize power means to move the member carrying the screen until not only the leading edge $E_1$ of the screen A has passed the coil $S_2$ but also it has reached the coil $S_1$, and the signal only passes through zero when the main screen A reaches its position of symmetry between the coils.

Such arrangements as those described in the previous two paragraphs have wide applications in the field of automatic control of machine tools. The displacement measuring device according to the invention could also be embodied in a load cell capable of weighing or of measuring forces over a range of ten thousand to one. By the provision of means for adjusting the positions of the coils in the direction of movement it is possible to bias the instrument in one direction and thus give the effect of a suppressed zero.

I claim:

1. Apparatus for measuring linear relative displacements between first and second relatively movable members comprising:

a screening vane mounted for movement with said first member and lying in a plane which contains the direction of relative displacement between said members;

a coil assembly fixed with respect to said second member including first and second input coils and first and second pickup coils, said first input and pickup coils lying on a first common axis transverse to the plane of said screening vane and second input and pickup coils lying on a second common axis parallel to said first axis and adjacent thereto in the direction of relative movement between said members, said input and pick up coils being disposed on opposite sides of the plane of said screening vane;

an alternating current generator connected to energize said input coils;

an indicating means connected to said pickup coils, said pickup coils being connected together in series opposition;

said screening vane having a tapered portion for changing the coupling between said input and pickup coils as a function of its position.

2. Measuring means according to claim 1 wherein said screening vane includes a first tapered portion that constantly increases in height from the leading edge of said screening vane, a second tapered portion that constantly increases in height from the trailing edge of said screening vane, said first and second tapered portions being separated from each other by a centrally disposed section of said vane of constant height for producing a signal on said indicating means when the central portion of said screening vane is displaced from said coil assembly.

3. Measuring means according to claim 2 wherein said indicating means is a zero-center meter connected to said coil assembly for indicating the direction as well as the magnitude of the displacement of the central portion of said screening vane from said coil assembly.

4. Apparatus for measuring linear relative displacement between first and second relatively movable members comprising:

a tapered screening vane mounted for movement with said first member and lying in a plane containing the direction of relative displacement between said members;

a coil and core assembly fixed with respect to said second member and including first and second input coils and first and second pickup coils, each of said coils being mounted on a separate core and each core being generally pot shaped and having an integral centrally disposed coil supporting leg, said first input and pickup coils lying on a first common axis transverse to the plane of said screening vane and said second input and pickup coils lying on a second common axis parallel to said first axis and displaced therefrom in the direction of relative movement between said members, said input and pickup coils being conductively isolated and positioned on opposite sides of the plane of said screening vane;

an alternating current generator connected to energize said input coil;

an indicating means connected to said pickup coils for indicating the relative position of said members;

said screening vane changing the coupling between said input and pickup coils as a function of its position.

References Cited by the Examiner

UNITED STATES PATENTS

| | | | |
|---|---|---|---|
| 2,057,835 | 10/36 | Karajan | 340—196 |
| 2,508,370 | 5/50 | Bozoian | 340—196 |
| 2,511,608 | 6/50 | Wannamaker | 340—196 |
| 2,631,027 | 3/53 | Payne | 340—196 |
| 2,683,989 | 7/54 | Clark | 340—196 |
| 3,005,969 | 10/61 | Wysocki | 340—196 |
| 3,032,754 | 5/62 | Pietro | 340—196 |

NEIL C. READ, *Primary Examiner.*

THOMAS B. HABECKER, *Examiner.*